7136X
B. Hinkley.
Hoe.
Patented Jun. 23, 1832.
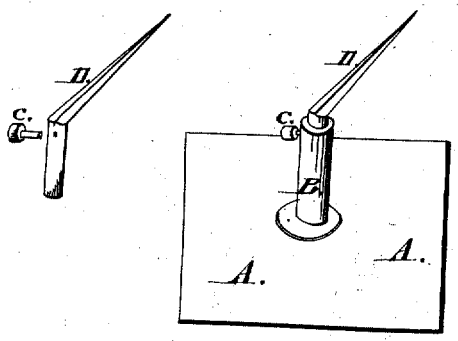
N. PETERS, PHOTO-LITHOGRAPHER, WASHINGTON, D. C.

7136X

UNITED STATES PATENT OFFICE.

BENJAMIN HINKLEY, OF FAYETTE, MAINE.

IMPROVEMENT IN HOES.

Specification forming part of Letters Patent dated June 23, 1832.

*To all whom it may concern:*

Be it known that I, BENJAMIN HINKLEY, of Fayette, county of Kennebec, and State of Maine, gentleman, have invented a new and useful Improvement upon Common Hoes, called "Hinkley's Improved Hoe;" and I do hereby declare that the following is an exact and full description of the construction and operation of the said hoe as invented by me.

In making this hoe I first take a steel or iron plate from six to eight inches square, (marked A in the drawing.) This plate may be made larger or smaller, as it is to be used as a field or garden hoe. Exactly on the center of this plate, and perpendicular to it, I rivet strongly a hollow iron tube, (marked B,) about one and a half inch in length. This tube may be either square or round, at the pleasure of the user or maker, the hollow part or interior of this tube to be about half an inch in diameter, the iron to be about one-eighth of an inch in thickness. The tube must be sufficiently thick to receive and hold a screw, (marked C.) Into this tube B is inserted an iron rod, (marked D,) which is made to move easily in the tube, and at the orifice of the tube this rod is bent at an angle of about forty-five degrees, more or less, as may be most convenient. On this crooked part, after it is flattened and pointed, is a handle, and the hoe is then complete. The screw C is used to confine the rod, to which the handle is affixed. By loosening this screw the handle may be turned to either side, and thus either edge of the hoe may be used as one or the other becomes dull or worn out. The plate is to be of steel or iron. The tube, corresponding somewhat to the eye of the common hoe, is to be of wrought or cast malleable iron, and the rod of wrought-iron.

I claim—

The improvement of placing the eye or tube on the center of the plate instead of one side of the movable rod, and of having four edges to the hoe instead of one.

BENJAMIN HINKLEY.

Witnesses:

S. A. KINGSBERY,

JOB HASKELL.